US008843270B2

(12) United States Patent
Kwon et al.

(10) Patent No.: US 8,843,270 B2
(45) Date of Patent: Sep. 23, 2014

(54) WIPER MOTOR CONTROL SYSTEM FOR VEHICLE

(75) Inventors: Mun Soon Kwon, Gyeonggi-do (KR); Hyun Sub Kim, Seoul (KR); Nak Kyoung Kong, Gyeonggi-do (KR)

(73) Assignee: Hyundai Motor Corporation, Seoul (KR)

( * ) Notice: Subject to any disclaimer, the term of this patent is extended or adjusted under 35 U.S.C. 154(b) by 197 days.

(21) Appl. No.: 13/425,758

(22) Filed: Mar. 21, 2012

(65) Prior Publication Data

US 2013/0124011 A1 May 16, 2013

(30) Foreign Application Priority Data

Nov. 11, 2011 (KR) ........................ 10-2011-0117406

(51) Int. Cl.
*G06F 7/00* (2006.01)
*B60S 1/08* (2006.01)

(52) U.S. Cl.
CPC ..................................... *B60S 1/0807* (2013.01)
USPC .......... 701/36; 701/49; 15/250.12; 15/250.27

(58) Field of Classification Search
CPC ........ B60S 1/04; B60S 1/0452; B60S 1/0469; B60S 1/08; B60S 1/0803; B60S 1/0807; B60S 1/166; B60S 1/0814; Y10S 318/02
USPC .................. 701/2, 36, 49; 318/444, 468, 483; 15/250.12, 250.17, 250.27
See application file for complete search history.

(56) References Cited

U.S. PATENT DOCUMENTS

| | | | | |
|---|---|---|---|---|
| 4,663,575 | A * | 5/1987 | Juzswik et al. | 318/444 |
| 2009/0248243 | A1 * | 10/2009 | Kwon | 701/36 |

FOREIGN PATENT DOCUMENTS

| | | | |
|---|---|---|---|
| JP | 07315173 | A | 12/1995 |
| JP | 09301131 | A | 11/1997 |
| JP | 2002524335 | A | 8/2002 |
| JP | 2005231590 | A | 9/2005 |
| JP | 2009056958 | A | 3/2009 |
| JP | 2009067275 | A | 4/2009 |
| JP | 2009119988 | A | 6/2009 |
| JP | 2009274576 | A | 11/2009 |
| KR | 1994-0009205 | | 10/1994 |
| KR | 10-0330259 | | 11/2001 |
| KR | 10-2006-0064772 | | 6/2006 |
| KR | 10-0783870 | | 12/2007 |
| KR | 10-0792904 | | 1/2008 |
| KR | 10-2009-0063705 | | 6/2009 |

* cited by examiner

*Primary Examiner* — Thomas Tarcza
*Assistant Examiner* — Kevin Myhre
(74) *Attorney, Agent, or Firm* — Edwards Wildman Palmer LLP; Peter F. Corless

(57) ABSTRACT

The present disclosure provides a wiper motor control system for a vehicle, which precisely controls the speed of the wiper motor to improve the wiper performance. The present disclosure implements a wiper motor control method in a new form, which precisely controls a speed of the wiper motor for each section through a scheme of improving a plate structure of the wiper motor and monitoring a state of a parking switch, and thus reduces a noise generated in an operation of a wiper device and increases the wiping performance through a differentiated speed for each section, which generally improves the wiper performance. More specifically, the present disclosure implements a smart ECW (Electric Control Wiper) control module inputting a remote control by a wireless transmitter, so that a driver can wirelessly control a wiper before getting into a vehicle, which makes the driver feel convenience and induces the driver to safely drive.

16 Claims, 9 Drawing Sheets

WIPER MOTOR STOP STATE:
CONNECTED WITH GND, DETECT 0V SIGNAL

WIPER MOTOR STOP STATE:
CONNECTED WITH GND, DETECT 0V SIGNAL

WIPER MOTOR CONTROL SYSTEM FOR VEHICLE

CROSS-REFERENCE TO RELATED APPLICATION

This application claims under 35 U.S.C. §119(a) the benefit of Korean Patent Application No. 10-2011-0117406 filed on Nov. 11, 2011, the entire contents of which are incorporated herein by reference.

BACKGROUND (a) Technical Field

The present invention relates to a wiper motor control system for a vehicle. More particularly, it relates to a wiper motor control system for a vehicle, which can precisely control a speed of a wiper motor to improve the wiper performance.

(b) Background Art

In general, a wiper device is installed in a vehicle to remove snow, rain, or other foreign substances from a windshield glass and/or a rear window glass. The wiper device is configured to wipe a glass through an operation of a wiper blade moved by a wiper motor, and increase the visibility through the windshield.

Various electronic control systems or sensors, and a plurality of switches have been added to recent wiper devices, so that the wiper device implements a more convenient and safer operation. For example, FIG. 1 is a circuit diagram illustrating a construction of a wiper device for a vehicle. In particular, a BCM (Body Control Module) 10 controls an output of a wiper relay 21 for a control of a wiper motor 11 based on signals of various switches such as an IGN2 switch as inputs.

In general, the wiper device operates the wiper blade, and includes a wiper motor which is configured to generate a rotary torque, a link apparatus which is configured to repeat a certain movement while being linked with the wiper motor, and a parking switch which is configured to control a plurality of sections, e.g., a B+ (operation section), ground (GND) (stop section), and OPEN (dead section).

Further, as shown in FIG. 2, the parking switch 10 of the wiper motor includes a plate 13 integrally rotating along with a rotation of a shaft, and sequentially arranged terminal B corresponding to "operation" and being connected to a multifunctional switch, terminal P corresponding to "stop", and terminal E connected to a vehicle body from the center of the plate.

Accordingly, as shown in FIG. 3, as a driver controls a multifunctional switch, power is supplied to a wiper motor and the wiper motor is operated on one cycle with ground (GND) (regular position stop section), B+ (operation section), and OPEN (dead section), which rotates the a wiper blade over the windshield of the vehicle.

Further, when the wiper motor is controlled to stop, the wiper motor is operated through the terminal B and terminal P before terminal B of the parking switch is short-circuited, the wiper motor is operated by inertia after terminal B is short-circuited, and the wiper motor is stopped by a connection between terminal E and terminal P when terminal B has short-circuited to finally stop the wiper motor from continuing to rotate.

However, this conventional wiper device has precision control limitations because the wiper motor is operated by a method in which power and GND are supplied to the wiper motor through a mechanical contact by connection of a plate within the wiper motor, and thus inconveniences wiper operations. For example, when a wiper blade switches its direction in an upper portion or a lower portion, a mechanical impulsive sound and an operation noise is generated and the wiping performance of the wiper device is limited because the wiper blade is controlled in a wiper motor operation section at a constant speed.

Meanwhile, some of advanced companies control a wiper motor speed with a pulse width modulation (PWM) control in order to overcome some of the disadvantages of the conventional the wiper device. Pulse-width modulation (PWM), or pulse-duration modulation (PDM), is a commonly used technique for controlling power to inertial electrical devices, made practical by modern electronic power switches. In PWM, the average value of voltage (and current) fed to the load is controlled by turning the switch between supply and load on and off at a fast pace. The longer the switch is on compared to the off periods, the higher the power supplied to the load is. The term duty cycle describes the proportion of 'on' time to the regular interval or 'period' of time. A low duty cycle corresponds to low power, because the power is off for most of the time. A duty cycle is expressed in a percentage, e.g., 100% being fully on.

However, these systems require that a wiper motor and all the main components of the system, such as the linkage, have to be newly developed and the wiper device cannot be widely applied due to an expensive system such as an H bridge and a Hall Integrated Circuit (IC). Thus, these types of systems are prohibitively costly.

SUMMARY OF THE DISCLOSURE

Accordingly, the present invention has been made to solve the above mentioned problems, and implements a method of controlling a wiper motor, which precisely controls a speed of the wiper motor for each section by improving a plate structure of the wiper motor and monitoring a state of a parking switch. As a result, an object of the present invention is to provide a wiper motor control system for a vehicle, which generally improves the wiper performance by reducing the noise during operation of a wiper device and further increasing wiping performance due to a differentiated speed for each section.

Further, another object of the present invention is to provide a wiper motor control system for a vehicle, which implements a smart ECW (Electric Control Wiper) control module having an input of a remote control by a wireless transmitter and enables a driver to wirelessly control a wiper before getting into a vehicle to provide additional convenience to the driver.

In order to accomplish the objects, the wiper motor control system provided by the present invention has the following features.

In one aspect, the present invention provides a wiper motor control system for a vehicle, including: a smart ECW (Electric Control Wiper) configured to control operation of a wiper motor according to an input signal from a parking switch, wherein a plate of the parking switch has two OPEN sections. For example, the two OPEN sections are located to have a phase difference of 180° from each other. A terminal B of the parking switch is connected with B+ power. A terminal E of the parking switch is simultaneously connected with a ground (GND), and a terminal P of the parking switch is connected with a smart ECW side in a circuit. Accordingly, a signal from the parking switch is input to the smart ECW, so that the smart ECW can variably control the output of the wiper motor in accordance with each section of the parking switch according to the input of the signal from the parking switch.

In an exemplary embodiment, the smart ECW includes a control unit (e.g., a micro-control unit (MCU), which can divide sections of the parking switch into three sections by a voltage difference and detect the divided three sections, a plurality of resistors included in the MCU and a circuit, and an input terminal connected with the terminal P of the parking switch. More specifically, when the signal from the parking switch is input, the smart ECW controls a wiper motor output by a method of detecting a predetermined voltage generated due to a partial voltage by an internal circuit.

In some exemplary embodiments, the smart ECW may discriminate a state of the wiper motor into three states. These three states include an operation state, a regular position stop state, and a dead section state. In particular, a signal input from each of an operation section (B+), a regular position stop section (GND), and a dead section (OPEN) of the parking switch are each used to discriminate and determine the state of the wiper motor at any particular instance in time.

In some embodiments, the smart ECW may perform a 100% duty cycle PWM control in an operation state of the wiper motor, a duty 30% PWM control in a regular position stop state of the wiper motor, and a 50% duty cycle PWM control in a dead section state of the wiper motor according to an input of a signal of the parking switch.

Furthermore, the smart ECW may perform a 50% duty cycle PWM control in the dead section state at least one time during the 100% duty cycle PWM control in the operation state of the wiper motor in one cycle of a wiper motor control.

In some exemplary embodiments, the smart ECW is connected with a BCM and a Manual Focus (M/F) switch through a Controller Area Network (CAN) communication line and is simultaneously configured to wirelessly communicate with a wireless transmitter to control the operation of the wiper motor according to an input of a signal from the wireless transmitter.

Advantageously, in the illustrative embodiment of the present invention, the state of the parking switch is monitored and the output of the wiper motor is variably duty PWM-controlled under a B+ condition, an OPEN condition, and a GND condition, so that it is possible to remove noise generated during a re-direction of the wiper blade and improves the wiping performance through maintaining a differentiated proper speed in each section.

Furthermore, the driver's visibility is further because it is possible to implement a control logic, which controls the speed of the wiper blade to-remain at a high speed in a central section between upper and lower sections through application. Additionally, the present invention is economically efficient because it constructs a system which adopts a method of controlling a motor speed by using an internal circuit of the smart ECW which receives an input signal from the parking switch or a hall sensor. Furthermore, the driver is able to remotely control the wipers from outside of the vehicle in order to further improve driver convenience.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

Figure 4:
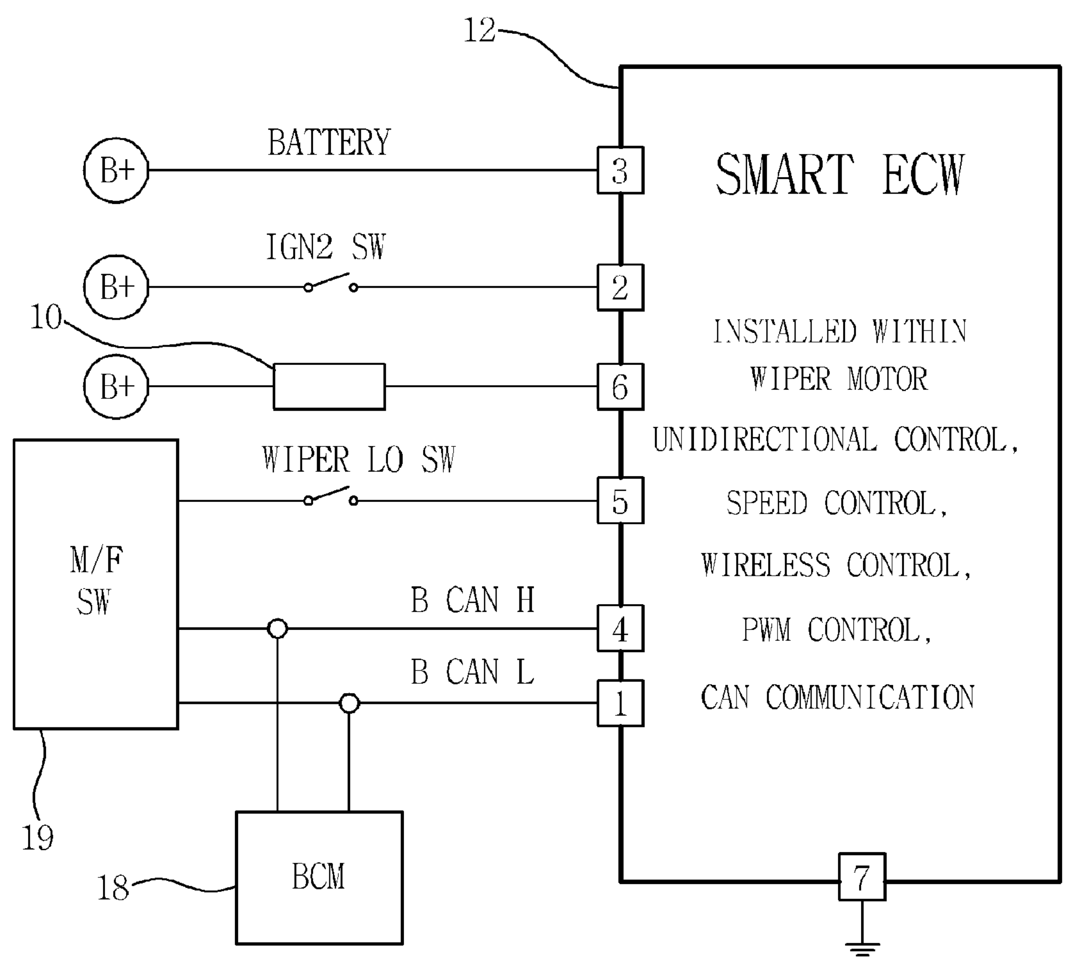
FIG. 4 is a block diagram of a wiper motor control system according to an exemplary embodiment of the present invention.
Figure 5:
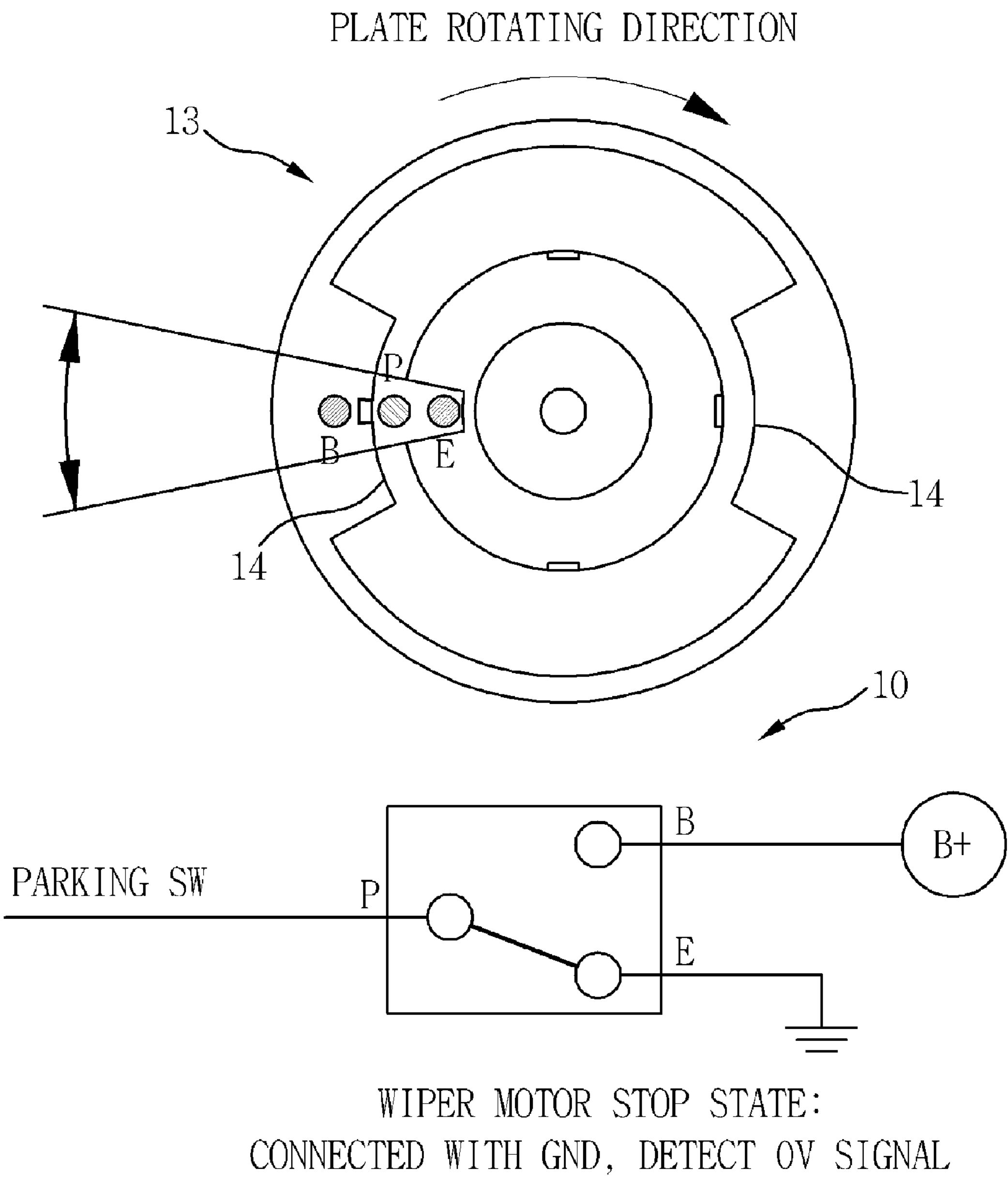
FIG. 5 schematically illustrates a plate structure of a parking switch in a wiper motor control system according to an exemplary embodiment of the present invention.

FIG. 4 is a block diagram of a wiper motor control system according to an exemplary embodiment of the present invention, and FIG. 5 schematically illustrates a plate structure of a parking switch in a wiper motor control system according to an embodiment of the present invention.

Figure 1:
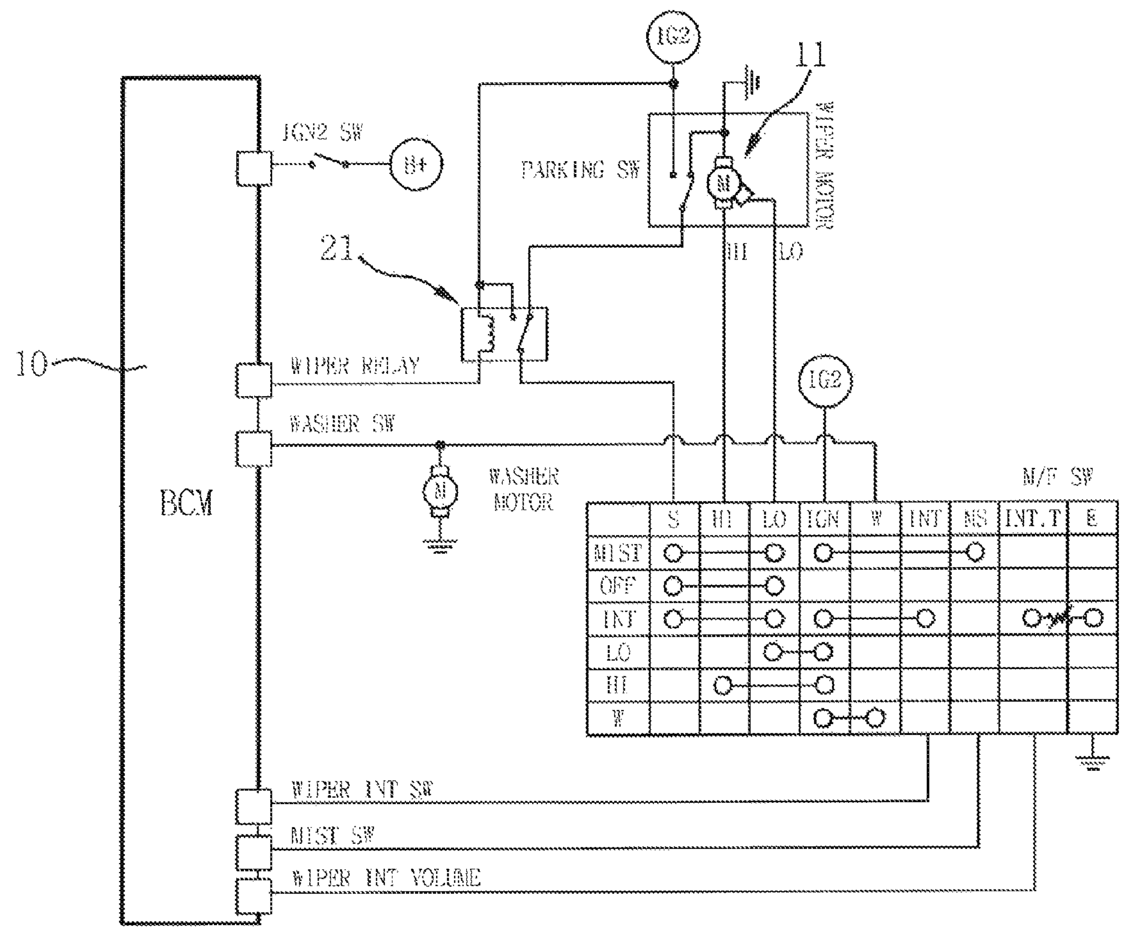
FIG. 1 is a circuit diagram illustrating a construction of a conventional wiper device for a vehicle.
Figure 2:
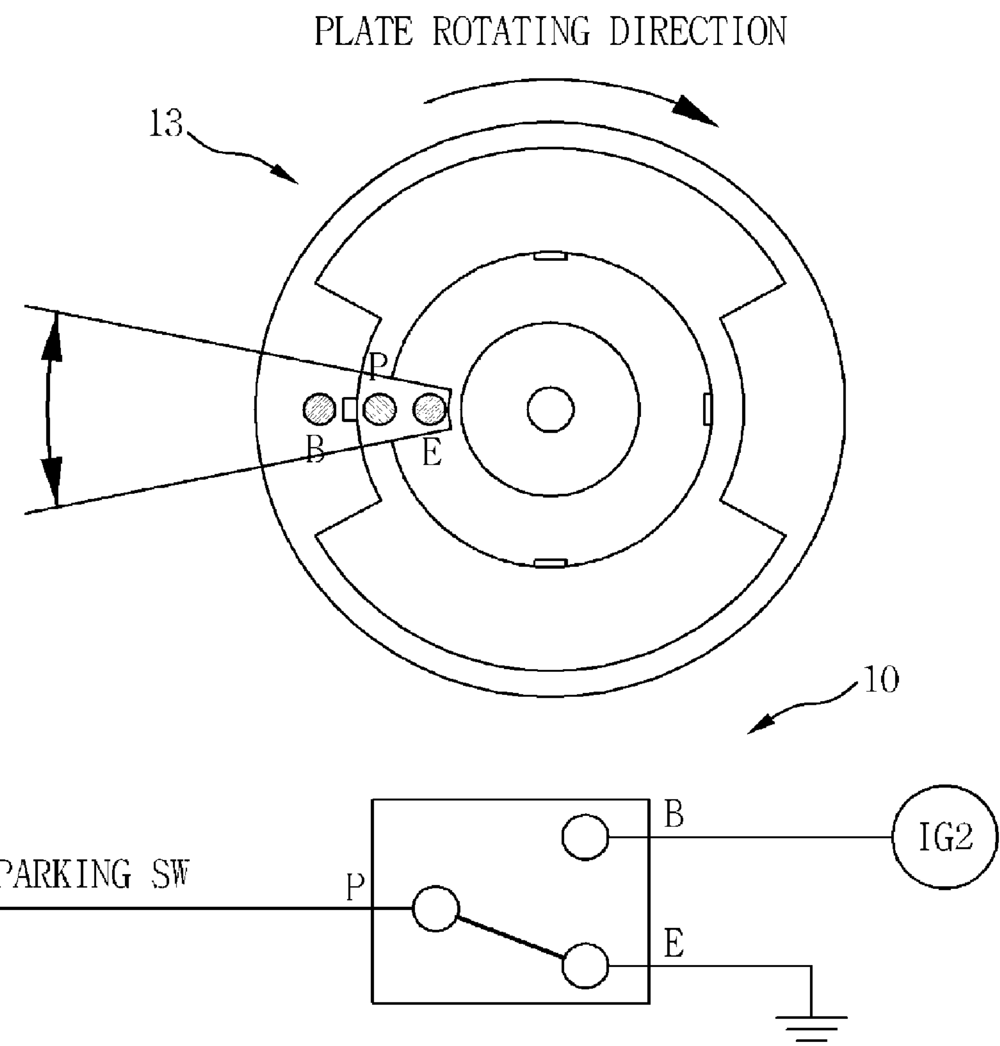
FIG. 2 schematically illustrates a plate structure of a parking switch in a conventional wiper device.
Figure 3:
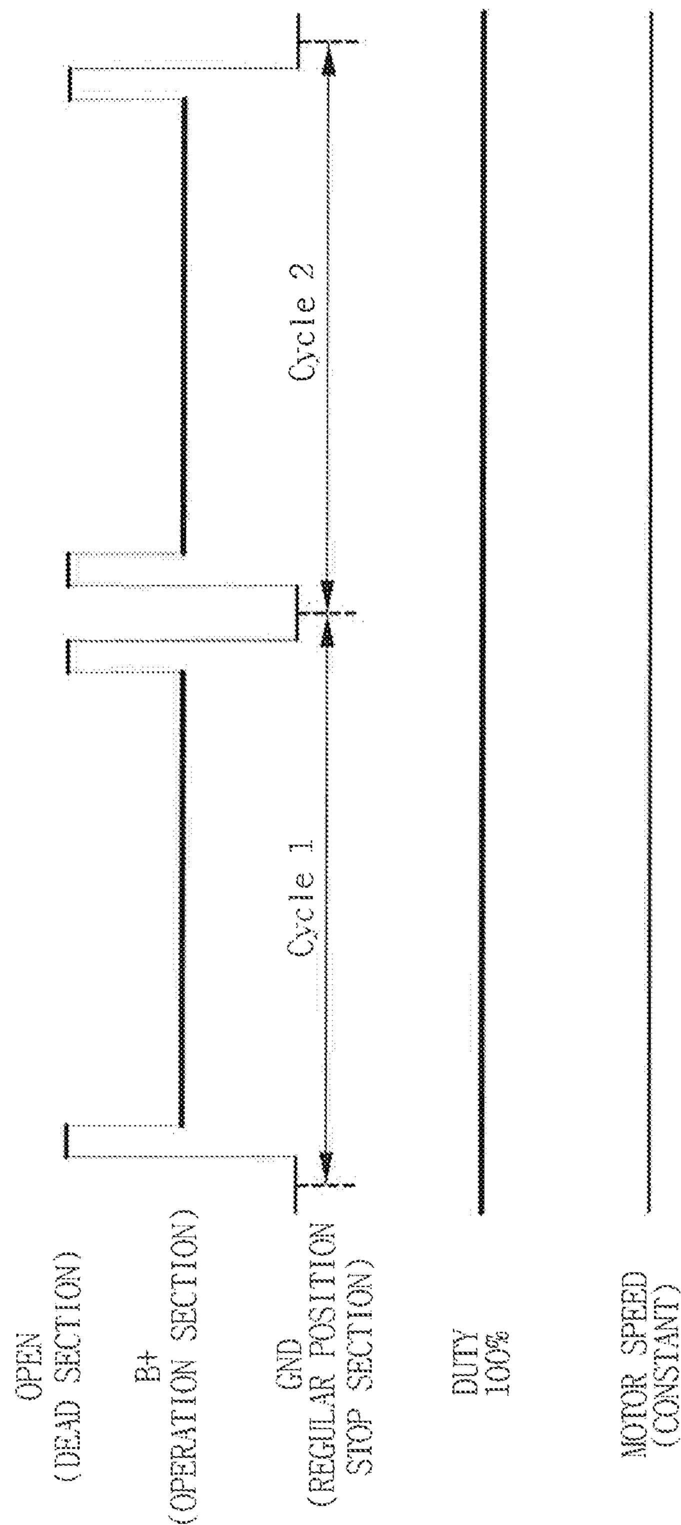
FIG. 3 is a time chart illustrating a parking switch signal and an output control state in the conventional wiper device.

As shown in FIGS. 4 and 5, the wiper motor control system includes a system configured to monitor a parking switch 10 connected to an Electric Control Wiper (ECW) 12 and to control an output (speed) of a wiper motor II (as shown in FIG. 1). That is, the smart ECW 12 performs a function of controlling an operation of the wiper motor 11 based on a signal from the parking switch 10 as an input. For this purpose, the smart ECW 12 performs a function of controlling an operation of the wiper motor 12 through an output control of a wiper relay (not shown) based on signals of various switches as inputs.

Signals from switches such as an IGN2 switch, a washer switch, a mist switch, a wiper INT switch, and a wiper INT volume are input to the smart ECW 12, and an operation of the wiper motor 11 is controlled through each of the switch signals. Here, the smart ECW, various switches and a wiper motor of the wiper device, a circuit construction between M/W switches, and a circuit construction of wiper relays are identical to those of the conventional art, so that their detailed descriptions are omitted.

The parking switch 10 includes a terminal B connected with to a positive side of a battery (B+), a terminal E connected with a ground (GND) side of the battery, and a terminal P connected with a smart ECW 12 side, and accordingly, a signal from the parking switch 10, for example, a voltage may be input to the smart ECW 12 side through the terminal P.

Particularly, the plate 13 included in the parking switch 10 has two OPEN sections 14. The two OPEN sections 14 are located so as to have a predetermined phase difference from each other, for example, a phase difference of 180°. Accordingly, when the signal from the parking switch 10 is input to the smart ECW 12, the smart ECW 12 can variably control an output of the wiper motor 11 with a signal in accordance with each section of the parking switch 10.

A system for variably controlling the output of the wiper motor 11 according to an input of a signal obtained from the two OPEN sections 14 included in the parking switch 10 is constructed, so that the present invention is cost effective and is thus able to implement an economical control system.

Figure 6:
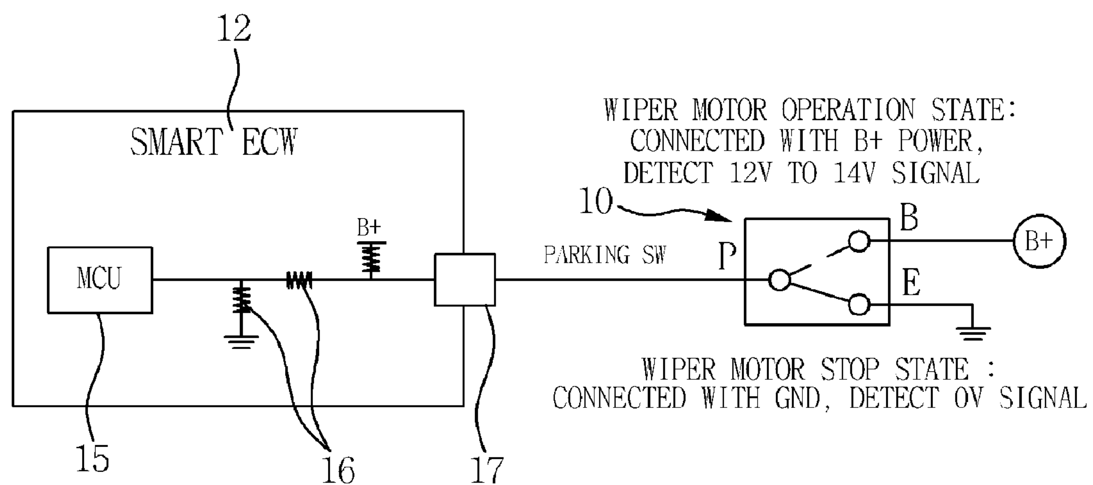
FIG. 6 is a circuit diagram illustrating a relation between a smart ECW and a parking switch in a wiper motor control system according to an exemplary embodiment of the present invention.

FIG. 6 is a circuit diagram illustrating a connection between a smart ECW and a parking switch in a wiper motor control system according to an embodiment of the present invention. As shown in FIG. 6, the smart ECW 12 has a circuit for discriminating signals of the parking switch 10 in an internal PCB.

For example, a PCB internal circuit divides sections of the parking switch 10 into three sections by a voltage difference in an MCU 15. That is, the PCB internal circuit is constructed so that the three sections are divided into an operation section (B+), a regular position stop section (GND), and a dead section (OPEN). The ECW 12 is able to detect and distinguish between these sections.

For this purpose, the smart ECW 12 includes the MCU 15, which can discriminately detect three states of the parking switch, a plurality of resistors 16 configuring the MCU 15 and the circuit, and an input terminal 17 connected with a terminal P side of the parking switch 10. Accordingly, when a signal is input from the parking switch 10 through the input terminal 17, the MCU 15 of the PCB internal circuit of the smart ECW 12 detects a predetermined voltage generated by a partial voltage using a resistor. As a result, the output of the wiper motor may be variably controlled through output control of the wiper relay by determining each of states of the wiper motor. That is, the three states include an operation state, a regular stop state, and a dead section state-indicating each of sections of the parking switch 10 are distinguished through the detected voltage.

For example, the smart ECW 12 can discriminately determine three states divided into the operation state, the regular position stop state, and the dead section state of the wiper motor through each of signals input in the operation section (B+), the regular position stop section (GND), and the dead section (OPEN) of the parking switch 10 as below.

1. Wiper motor operation state

A variable range of 12V to 14V, or a constant of 12V power is generally supplied, and a predetermined voltage by a resistor within the smart ECW 12 is generated, so that the MCU 15 detects the generated voltage and determines that the wiper motor is in an operational state.

2. Wiper motor regular position stop state

The parking switch 10 is connected to the terminal E, that is the GND (0V), and the MCU 15 determines that the parking switch is in a regular position stop state.

3. Parking switch dead section state

Parking switch 10 is in a dead section state, not in the operation state or the regular position stop state, and the MCU 15 detects a predetermined voltage generated by a partial voltage due to B+ power within the smart ECW 12 and determines that the parking switch is in the dead section state. For example, when the parking switch 10 is disposed in the OPEN section between the terminal B and the terminal E, a signal from the parking switch 10, for example, a voltage more than 0V and less than 12V is input to the smart ECW 12, and the MCU 15 continuously detects a predetermined voltage generated by a partial voltage within the smart ECW 12 and can determine that the parking switch 10 is in the dead section state.

Particularly, the smart ECW 12 can variably control an output of the wiper motor through a signal from each section input from the parking switch 10 by using a pulse width modulation (PWM) control using a duty ratio as described above.

Figure 7:
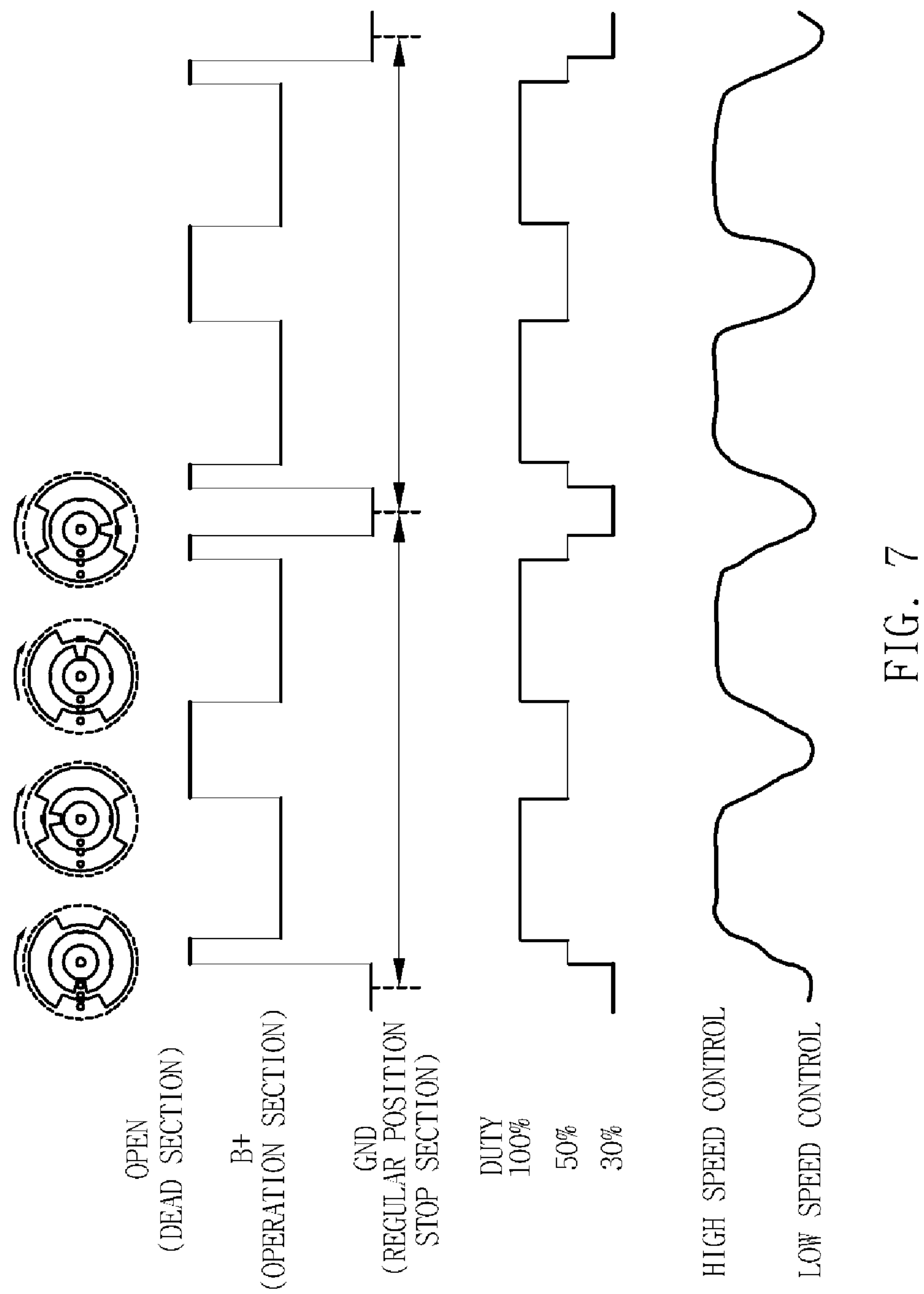
FIG. 7 is a time chart illustrating a parking switch signal and an output control state in a wiper motor control system according to an exemplary embodiment of the present invention.

For example, FIG. 7 shows a parking switch signal time chart when the wiper motor operates. A time chart as shown in FIG. 7 may be constructed to grasp a parking switch signal and a plate position according to a time when the wiper motor operates, and accordingly, a wiper motor position may be divided into three sections as below (detection signal: B+, GND, and OPEN).

1. Wiper motor operation section: the parking switch generates a B+(12V) signal.

2. Wiper motor regular position stop section: the parking switch generates a GND (0V) signal.

3. Wiper motor dead section: the parking switch generates an OPEN signal, not the B+ signal and the GND signal.

Accordingly, the MCU detects a predetermined voltage generated by partial voltage created by a circuit within the smart ECW and can determine the three section states, so that the wiper motor can be variably controlled. That is, the smart ECW 12 performs a 100% duty cycle PWM control in the wiper motor operation state, a 30% duty cycle PWM control in the wiper motor regular position stop state, and a 50% duty cycle PWM control in the wiper motor dead section. As described above, when the duty cycle is 100% the power is supplied to the motor continuously and when the duty cycle is 50% the power on only 50% of the time.

Accordingly, a duty ratio/cycle for the wiper motor is gradually increased by 30%, 50%, and 100% or decreased from the wiper motor regular stop section to the operation section via the dead section (OPEN section). That is, the speed of the wiper blade from a time point where the wiper blade is first operated in a lower portion of the windshield to a time point where the wiper blade is operated in earnest and to a time point where the wiper blade returns to the lower portion of the windshield and completes one cycle is gradually increased, so that the wiper can move with more flexibly. The above control is repeatedly achieved even when the next cycle is started. As a result, the overall operational performance of the wiper may be further improved.

In particular, when one cycle of the wiper motor is controlled, the 50% duty cycle PWM control in the dead section may be performed at least one time during the 100% duty cycle PWM control in the wiper motor operation state. That is, during one instance of reciprocating motion of the wiper blade, when the wiper blade switches its direction at an upper point on the windshield by using a signal input from another OPEN section included in the plate of the parking switch, the noise generated when the wiper blade switches its direction may be minimized by decreasing the speed of the wiper motor (to e.g., a 50% duty cycle PWM control) stage by stage and then increasing the speed of the wiper motor from a time point where the direction of the wiper blade is switched (50% duty cycle PWM control) stage by stage again.

The present invention also provides a method, which can variably control an output of the wiper motor by using a signal provided from a hall sensor as well as a signal provided from the parking switch. For example, the present invention includes a gear of the wiper device and a hall sensor (not shown) installed at one side of the gear, and provides a signal output from the hall sensor, for example, a voltage of 0V or 5V to the smart ECW, so that the smart ECW can variably and properly control an output of the wiper motor as a 30%, 50%, and 100% duty cycle based on the input signal.

Figure 8:
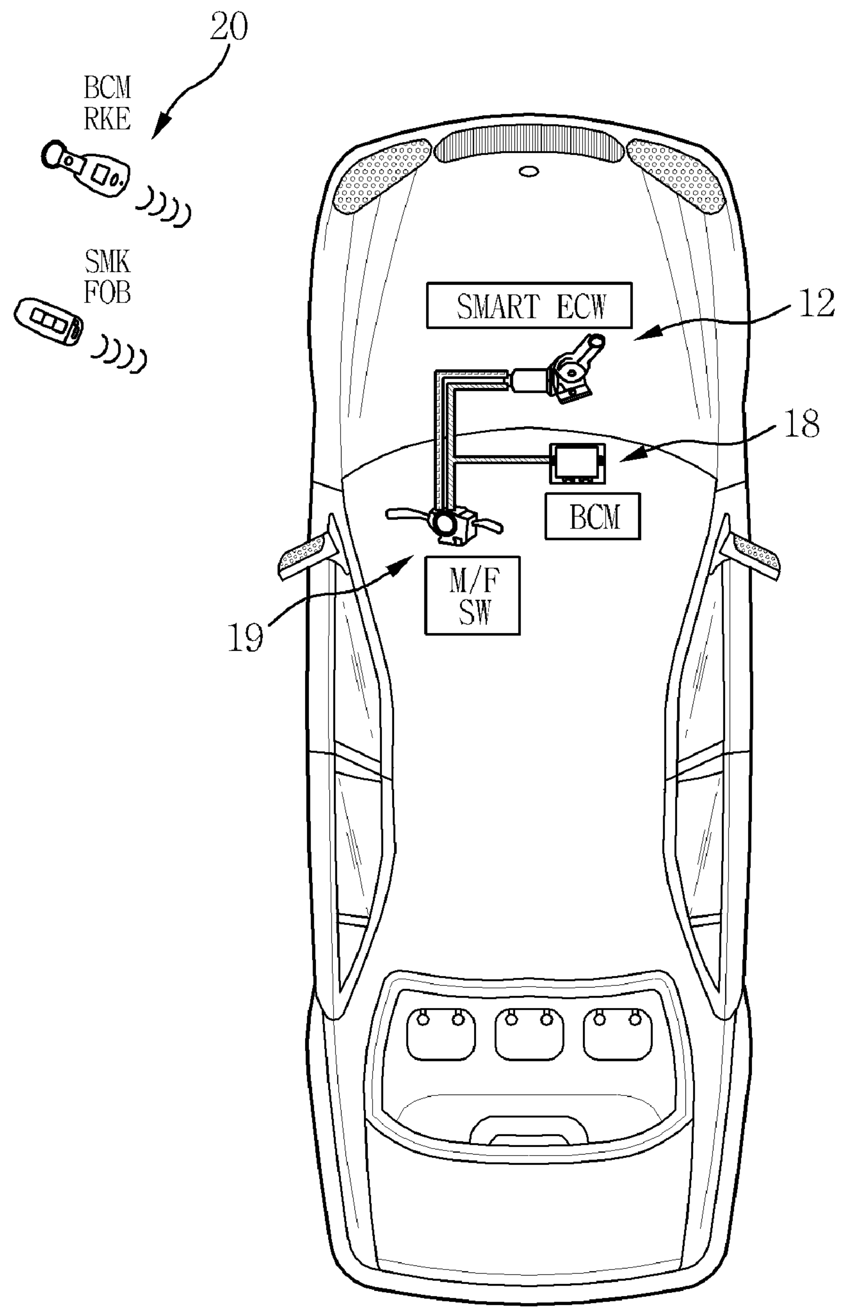
FIG. 8 schematically illustrates a wireless control relation of a wiper motor in a wiper motor control system according to an exemplary embodiment of the present invention.

FIG. 8 schematically illustrates a wireless control relationship of a wiper motor in a wiper motor control system according to an embodiment of the present invention. As shown in FIG. 8, the smart ECW 12 is connected with a BCM 18 and an M/F switch 19 by a CAN communication line, and at this time, the smart ECW 12 has a control logic enabling wireless communication with a wireless transmitter 20 controlled remotely by a driver.

Accordingly, the smart ECW 12 can control an operation of the wiper motor based on a signal from the wireless transmitter 20 controlled by a driver as an input. For example, when the driver desires to operate a wiper by using, e.g., a TX wireless transmitter, before getting into a vehicle, the driver can activate an operation mode to remotely control the wiper motor for a predetermined time. As a result, the driver can remotely wipe a front glass of the vehicle before driving the vehicle when it is, e.g., raining or snowing outside, and can secure a driver's view before getting into the vehicle, thereby improving driver convenience.

Meanwhile, the present invention also allows the driver to position the wiper blades in a location that makes them easy to replace through wireless control as well. For example, the present invention provides an advantage of conveniently stopping the wiper blades in the center of the windshield so that the driver can easily replace the wiper blades. This aides drivers particularly who own big vehicles such as an SUV or a RV vehicle.

For this purpose, the driver controls the wiper blade to enter an operation mode through a control of the wireless transmitter and performs a wiper motor center position stop control by monitoring the parking switch, so that the wiper blade may be stopped in the center of the windshield and the driver can more conveniently replace the wiper blades.

Figure 9:
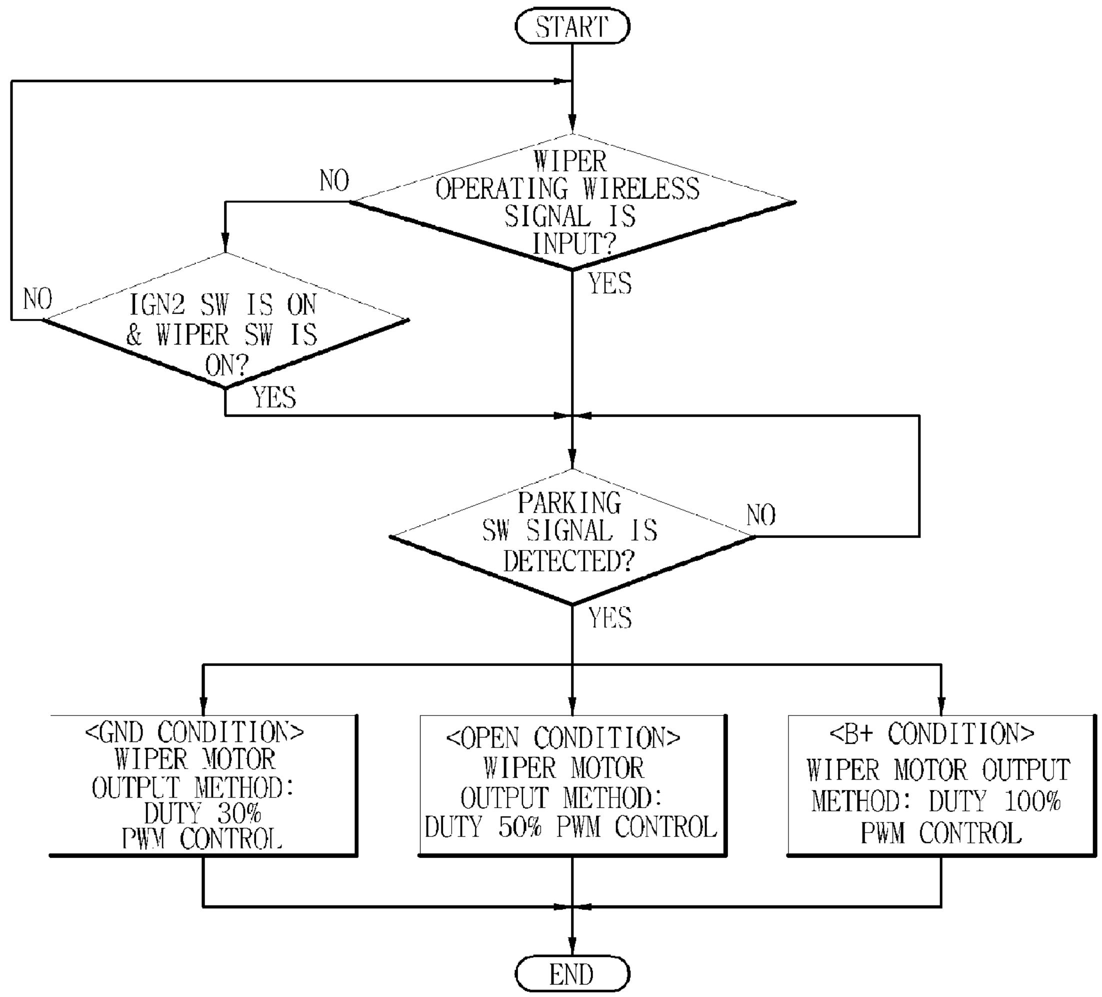
FIG. 9 is a flowchart illustrating a wiper motor wireless control method and a PWM control method in a wiper motor control system according to an exemplary embodiment of the present invention.

FIG. 9 is a flowchart illustrating a wiper motor wireless control method and a PWM control method in a wiper motor control system according to an embodiment of the present invention. When a wiper switch reaches an "ON" state when a wireless signal is input or an IGN2 switch for a wiper operation is "ON", states (state for each section) of the parking switch are detected, and a 30% duty cycle control is performed in a GND condition, a 50% duty cycle control is performed in an OPEN condition, and a 100% duty cycle control is performed in a B+ condition.

At this time, wiper switches related to low, high, mist, and intermediate (INT) controls maintain an "ON" state, and the wireless signal for the wiper operation may include a signal for detecting a rain drop or dust by a sensor after receiving a wireless signal when, e.g., a wireless transmitter having a separate switch is successively operated at least two times within two seconds. More specifically, a process of first determining if a wiper operating wireless signal is input is performed.

When the wireless signal for the wiper operation is input, a step of detecting a next parking switch signal is performed. When there is no wireless signal for the wiper operation, the system determines if the IGN2 switch and a wiper switch are in an "ON" state, and a step of detecting a next parking switch signal is performed when the two switches all are in an "ON" state. At this time, when one of the two switches is not in an "ON" state, a step returns to a start step.

Next, a step of detecting a parking switch signal is performed. As a result of the detection, an output of the wiper motor may be variably and properly controlled according to a signal for each section of the parking switch. For example, the output of the wiper motor is controlled by a 30% duty cycle PWM in the GND condition, by a 50% duty cycle PWM in the OPEN condition, and by a 100% duty cycle PWM in the B+ condition.

As described above, the present invention applies communication in comparison with the conventional wiper system, so that a circuit is simple with fewer wires. This reduces the total system weight and provides a good After Sales (A/S). Further, the conventional wiper system has difficulties in that a layout inspection is required for a new structural design and installation in a linkage. The present invention, however, maintain mechanical safety since it can utilize an already proven linkage structure of the conventional system.

Furthermore, with respect to the mechanical noise problem generated during a direction switch in a linkage operation in the conventional wiper system, the present invention can perform low speed control in a linkage noise generation section with a PWM control to reduce noise in comparison with the conventional art. Moreover, the present invention can implement a new function, which cannot be achieved in the convention wiper system, and more specifically, the present invention can add a convenient function via wireless control and diagnose a state of the parking switch by monitoring the state of the parking switch. In addition, the present invention can utilize the linkage structure of the conventional system, and thus reduces costs of the conventional system while maintaining mechanical safety.

What is claimed is:

1. A wiper motor control system for a vehicle, comprising:

a body control module (BCM) configured to control an output of a wiper relay; and a smart ECW (Electric Control Wiper) control module configured to control operation of a wiper motor according to an input from a parking switch, wherein the smart ECW is connected with the BCM and a manual focus (M/F) switch through a controller area network (CAN) communication line, wherein a plate disposed within the parking switch has two OPEN sections, and a terminal B of the parking switch is connected to a positive end of a power source (B+), a terminal E of the parking switch is simultaneously connected to a ground (GND) of the power source, and a terminal P of the parking switch is connected to a smart ECW side in a circuit, and wherein a signal of the parking switch is input to the smart ECW control module, and wherein the smart ECW control module is configured to variably control an output of the wiper motor in accordance with each section of the parking switch based on input from the parking switch.

2. The wiper motor control system of claim 1, wherein the two OPEN sections formed in the plate of the parking switch are located to have a phase difference of 180° from each other.

3. The wiper motor control system of claim 1, wherein the smart ECW control module comprises an microcontroller unit (MCU), which divides sections of the parking switch into three sections by a voltage difference and detects the divided three sections, a plurality of resistors disposed within the MCU and a circuit, and an input terminal connected to the terminal P of the parking switch, wherein, when the signal of the parking switch is input, the smart ECW control module controls a wiper motor output by detecting a predetermined voltage generated due to a partial pressure by an internal circuit.

4. The wiper motor control system of claim 1, wherein the smart ECW control module discriminates a state of the wiper motor into three states based on an input from the parking switch which is correlated to a particular state of the three states, wherein the three states are an operation state, a regular position stop state, and a dead section state, and determines the states of the wiper motor based on the discrimination.

5. The wiper motor control system of claim 1, wherein according to an input to the parking switch, the smart ECW control module performs a 100% duty cycle PWM control of the wiper motor when the parking switch is in an operation state, a 30% duty cycle PWM control of the wiper motor when the parking switch is in a regular position stop state, and a 50% duty cycle PWM control of the wiper motor when the parking switch is in a dead section state.

6. The wiper motor control system of claim 5, wherein the smart ECW control module performs the 50% duty cycle PWM control of the wiper motor when the parking switch is in the dead section state at least one time during the 100% duty cycle PWM control in the operation state of the wiper motor in one cycle of a wiper motor control.

7. The wiper motor control system of claim 1, wherein the smart ECW control module is simultaneously configured to wirelessly communicate with a wireless transmitter to control an operation of the wiper motor according to an input from the wireless transmitter.

8. The wiper motor control system of claim 7, wherein the wiper motor is configured to be wirelessly controlled to stop in a center of a windshield.

9. The wiper motor control system of claim 1, wherein the wiper motor is configured to be wirelessly controlled through the CAN.

10. A method for controlling a wiper motor in a vehicle, the method comprising:

controlling, by a body control module, an output of a wiper relay;

receiving, by a smart electronic control wiper (ECW) control module, an input to power on a wiper motor;

detecting, by the smart ECW control module, whether a parking switch is in a ground (GND) condition, a dead condition or an operation condition; and in response to detecting the condition of the parking switch, variably controlling, by the ECW control module, the wiper motor through pulse width modulation based upon which condition is currently being detected by the smart ECW control module, wherein during one instance of reciprocating motion of the wiper blade, when the wiper blade switches direction at an upper point on the windshield by using a signal input from one OPEN section of two OPEN sections included in a plate of the parking switch, noise generated when the wiper blade switches direction is minimized by decreasing a speed of the wiper motor stage by stage and then increasing the speed of the wiper motor from a time point where the direction of the wiper blade is switched back stage by stage again.

11. The method of claim 10, further comprising performing, by the smart ECW control module according to an input from the parking switch, a 100% duty cycle PWM control of the wiper motor when the parking switch is in an operation state, a 30% duty cycle PWM control in a regular position stop state, and a 50% duty cycle PWM control of the wiper motor when the parking switch is in a dead section state.

12. The method of claim 11, further comprising performing the 50% duty cycle PWM control of the wiper motor when the parking switch is in the dead section state at least one time during the 100% duty cycle PWM control in the operation state of the wiper motor in one cycle of a wiper motor control.

13. The method of claim 10, further comprising wirelessly communicating with a wireless transmitter to control an operation of the wiper motor according to an input from the wireless transmitter.

14. The method of claim 13, further comprising wirelessly controlling the wiper motor to stop in a center of a windshield.

15. The method of claim 10, further comprising wirelessly controlling the wiper motor via a Controller Area Network (CAN) and a wireless transmitter.

16. The wiper motor control system of claim 1, wherein during one instance of reciprocating motion of a wiper blade when the wiper blade switches its direction at an upper point on the windshield by using a signal input from one OPEN section of the two OPEN sections included in the plate of the parking switch, the noise generated when the wiper blade switches its direction is minimized by decreasing the speed of the wiper motor stage by stage and then increasing the speed of the wiper motor from a time point where the direction of the wiper blade is switched stage by stage again.

* * * * *